(12) United States Patent
Boltz et al.

(10) Patent No.: US 6,246,889 B1
(45) Date of Patent: Jun. 12, 2001

(54) SYSTEM, METHOD, AND APPARATUS FOR DELAYED CALL ANSWERING

(75) Inventors: David Boltz, Garland; Vladimir Alperovich, Dallas, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/993,384

(22) Filed: Dec. 18, 1997

(51) Int. Cl.$^7$ ........................................ H04B 1/38
(52) U.S. Cl. .................. 455/567; 455/412; 455/560; 379/142
(58) Field of Search ......................... 455/552, 556, 455/566, 567, 569, 412, 413, 560; 379/127, 142, 247

(56) References Cited

FOREIGN PATENT DOCUMENTS

WO 94/29992  12/1994  (WO).
WO 96/12378  4/1996  (WO).

Primary Examiner—William G. Trost
Assistant Examiner—Rafael Perez-Gutierrez
(74) Attorney, Agent, or Firm—Jenkens & Gilchrist P.C.

(57) ABSTRACT

A system, method, and apparatus allowing a called party to play a message to the calling party, instructing the calling party that the called party is present and will become available in a given amount of time. A group switch is implemented which can selectively connect an incoming line to either an outgoing line for communication with the called party or an announcement machine which plays a message instructing the called party not to disconnect. The called party can then answer the call at their leisure.

17 Claims, 3 Drawing Sheets

SYSTEM, METHOD, AND APPARATUS FOR DELAYED CALL ANSWERING

BACKGROUND OF THE PRESENT INVENTION

1. Field of the Invention

The present invention relates generally to telecommunication systems, methods, and apparatus for subscriber features, and more specifically to a method, system, and apparatus for delayed call answering.

2. Background and Objects of the Present Invention

The widespread availability of mobile phones permits subscribers to remain in contact with others at virtually any given time. A mobile phone subscriber is not required to remain in close proximity to a fixed phone line like an ordinary subscriber. Thus, the mobile phone subscriber can remain in contact while in transit.

While a mobile phone subscriber can be contacted at virtually any given time, there are a number of temporary circumstances in which a mobile phone subscriber may not desire, or even be able to respond when contacted. An example might be when a call is received by a mobile phone subscriber who is in attendance at a public gathering or meeting. The first distraction occurs when the mobile phone alerts the subscriber by ringing. The distraction is aggravated when the mobile phone subscriber answers the call and begins a conversation.

An alternative approach to solve this problem is to manufacture mobile phones that vibrate instead of ring when receiving an incoming call. This approach avoids the distractions caused by an audible ring during a public gathering or meeting. Moreover, the distraction of an incoming call can be completely avoided if the mobile phone subscriber ignores the incoming call.

Ignoring the incoming call causes the call to either be rerouted to a voice mail or be abandoned by the calling party. This could be undesirable when an important call is received while the mobile phone subscriber is temporarily unable to respond. In such a case, the mobile phone subscriber may wish to indicate their presence, but avoid creating a distraction for others. Presently, this is extremely problematic since the mobile phone subscriber must verbally indicate their presence, thus creating a distraction.

It is therefore an object of the invention to provide a way for a called party to indicate their presence to a calling party unobtrusively, particularly without having to make a verbal reply.

SUMMARY OF THE INVENTION

The present invention is directed to a method for answering a call by forwarding the call to the called party, receiving the subscriber selection from the called party, and responsive to the subscriber selection, transmitting a message to the calling party, if the call receives delayed answer treatment, receiving another subscriber selection from the called party, and setting up a voice connection when the called party chooses to answer the call receiving delayed answer treatment.

The present invention is also directed to a phone which includes a transceiver for receiving a call and transmitting an electronic signal, a control panel for inputting a subscriber selection signal, a microphone memory for storing prerecorded messages, a controller for receiving inputs from the control panel, and if the input is a delayed answering signal, forwarding a prerecorded message to the transceiver, and if the input is a call answering signal, connecting the microphone to the transceiver.

The present invention is also directed to a system for answering a call which includes an outgoing line for alerting the called terminal, a transmitter for transmitting a prerecorded message to the calling terminal, a group switch for connecting an incoming line to either the outgoing line or the transmitter and a traffic handler for handling a subscriber selection command and directing the group switch to either connect the incoming line to the outgoing line or the transmitter.

The present invention is additionally directed to a switching office for routing a call including an incoming line for receiving a call, an outgoing line connected to a transceiver in communication with the called party, an announcement machine with a prerecorded message, a group switch connected to the incoming line, for connecting the incoming line to the outgoing line responsive to one control signal, and connecting the incoming line to the announcement machine responsive to another control signal, and a traffic handler for handling a subscriber selection signal from the subscriber, and providing one control signal if the subscriber's selection is a call answering signal, and providing another control signal if the subscriber's selection is a delayed answering signal.

BRIEF DESCRIPTION OF THE DRAWINGS

The disclosed invention is described with reference to the accompany drawings, which illustrate sample embodiments of the invention and which are incorporated in the specification hereof by reference, wherein.

DETAILED DESCRIPTION OF PRESENTLY PREFERRED EXEMPLARY EMBODIMENTS

The numerous innovative teachings of the present application are described with particular reference to the presently preferred exemplary embodiments. However, it is understood that these embodiments provide only a few examples of the many advantageous uses of the innovative teachings herein. It should be understood that statements made in the specification of the present application do not necessarily delimit any of the various claimed inventions. Moreover, some statements may apply to some inventive features but not to others.

Figure 1:
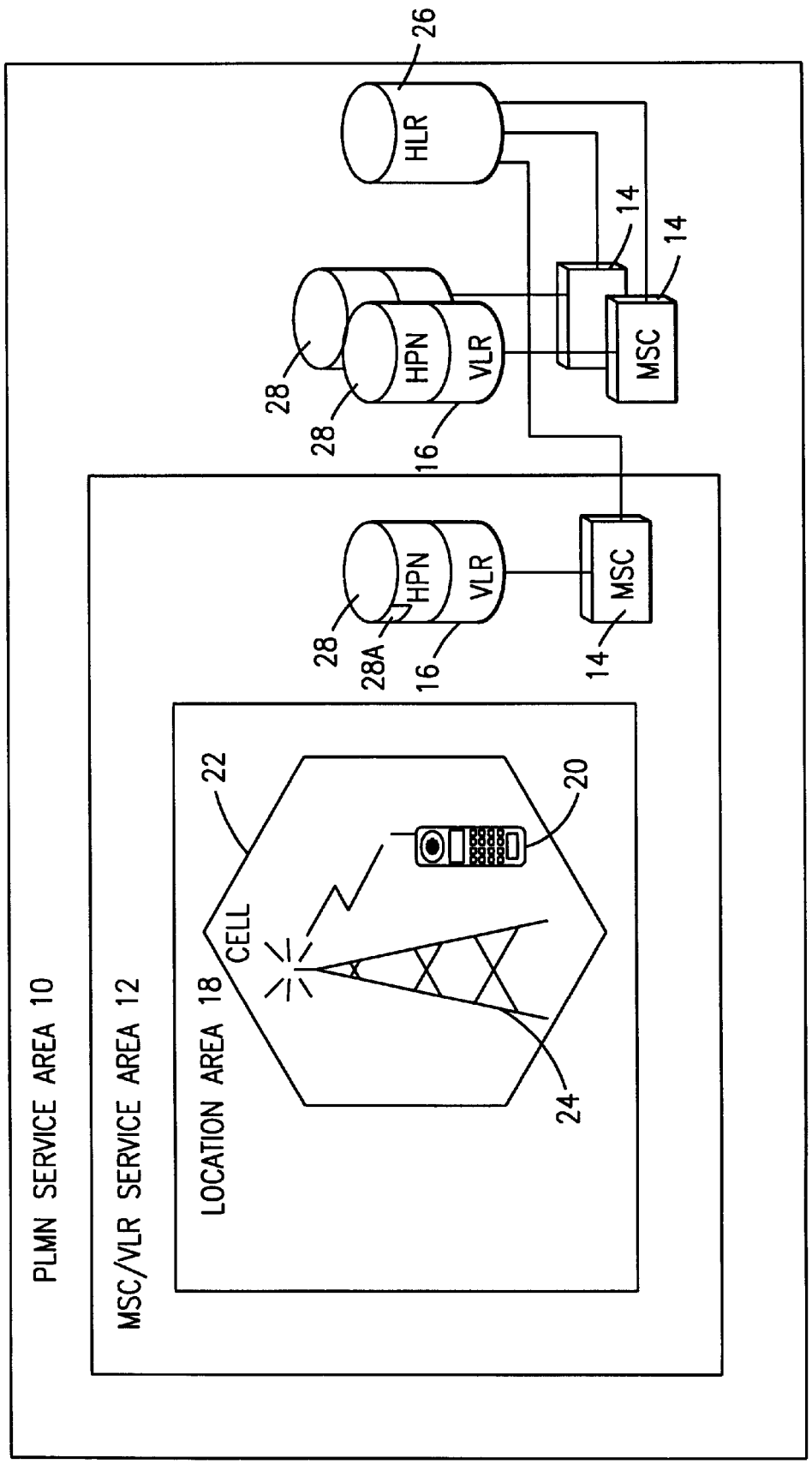
FIG. 1 is an exemplary illustration of a wireless network.

Referring now to FIG. 1 of the drawings, an exemplary wireless network, such as a Global System for Mobile Communication (GSM) Public Land Mobile Network (PLMN) 10, is described. The PLMN 10 is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile phone subscribers to communicate with the wireless network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or wireless network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 requests data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

When the MSC 14 receives a call terminating at MS 20, the MSC 14 directs the BSS 25 to transmit via the BTS 24, a signal alerting the MS 20. In response to the alert, the subscriber at MS 20 can either answer the call, ignore the call, or place the call on delayed answering. If the subscriber chooses to place the call on delayed answering, the MS 20 transmits a signal, so informing the MSC 14.

Those skilled in the art will recognize that the subscriber's choice can be communicated to the MSC 14 in a variety of ways. For example, the MS 20 might have a special button or switch 306A (shown on the MS 20 in FIG. 3) which is used to place an incoming call on delayed answering. In another embodiment, delayed answering might be implemented as a subscriber feature where a subscriber presses a set of keys on the MS 20 (such as a number of keys 306B shown in FIG. 3). The MS 20 then transmits, for example, what is known by those skilled in the art as an Unstructured Supplementary Service Data (USSD) signal which is received by the BSS 25 and forwarded to the MSC 14.

Figure 2:
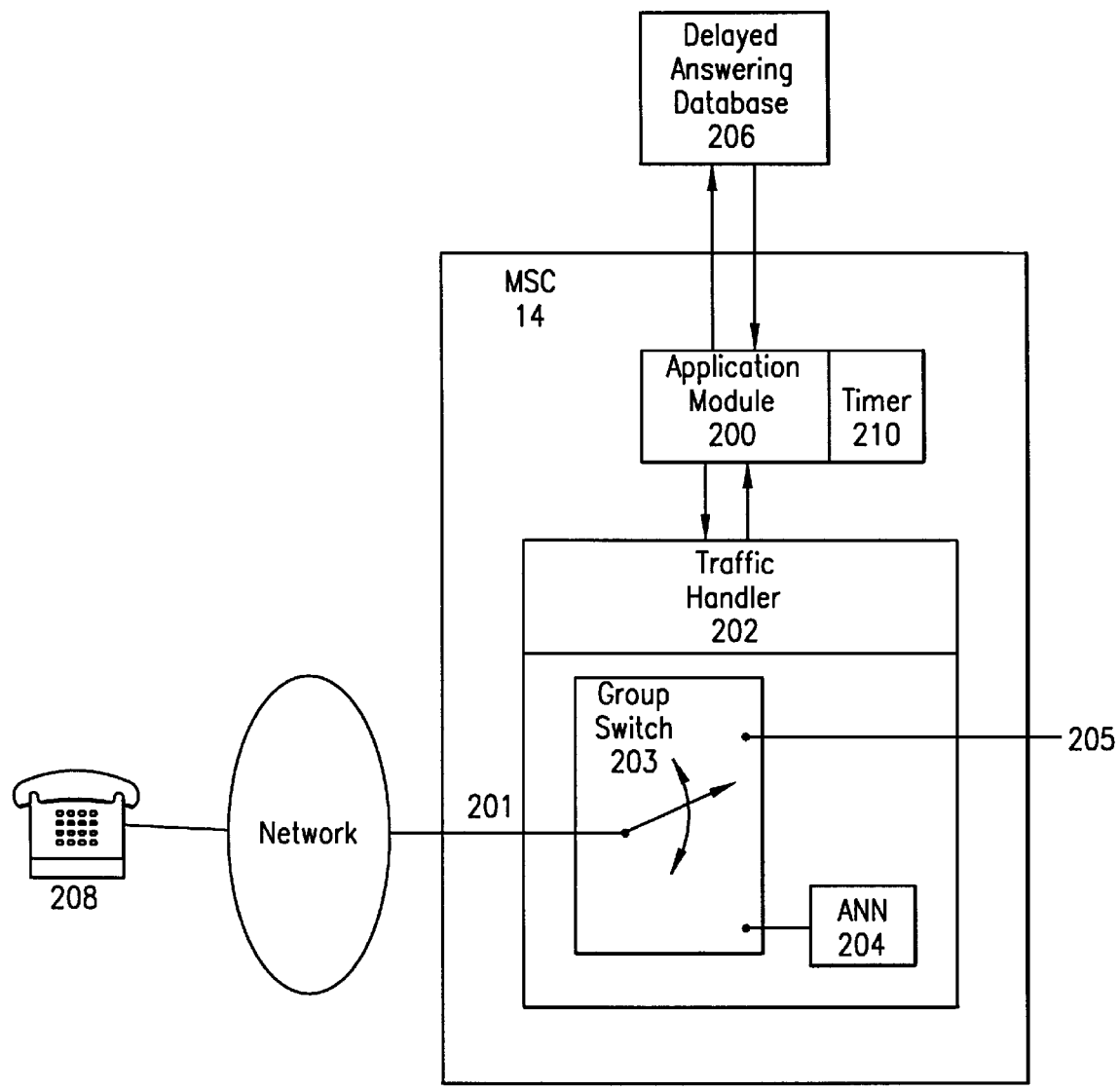
FIG. 2 is a block diagram of a Mobile Switching Center (MSC) embodying the present invention.

Referring now to FIG. 2, a switching office, such as MSC 14, embodying the subject matter of the present invention is described. The MSC 14 includes therein an application module 200 and a traffic handler 202, and is connected to a delayed answering database 206. In operation, the MSC 14 receives a call originating from a calling terminal 208 and terminating at the MS 20 via an incoming line 201. The MSC 14 is connected to the BSS 25 via outgoing line 205, also shown in FIG. 1. The incoming line 201 and the outgoing line 205 are both connected to a group switch 203. The announcement module 204 is also connected to the group switch 203.

The group switch 203 normally connects the incoming line 201 to the outgoing line 205 and is controlled by the traffic handler 202. However, the group switch 203 can also be set by the traffic handler 202 to connect the incoming line 201 to the announcement module 204.

The delayed answering database 206 is preferably a database which cross-references directory numbers of mobile stations with prerecorded messages. Although shown connected to a single MSC 14 in FIG. 2, those skilled in the art will recognize that the delayed answering database 206 can be integrated and connected to several MSCs 14.

If the subscriber at an MS 20 decides to place a call on delayed answering, e.g., by pressing the button or switch 306A or the keys 306B, the application model 200 receives a USSD indicating a request for delayed answering from the MS 20. The application module 200 accesses the delayed answering database 206 and retrieves the prerecorded message associated with the directory number of the called party. This prerecorded message is then forwarded to the announcement module 204. The application module 200 then sets up delayed answering by directing the traffic handler 202 to set the group switch 203 to connect the incoming line 201 to the announcement module 204.

When the incoming line 201 is connected to the announcement module 204, the prerecorded message is transmitted to the caller informing the caller of the delayed answering. The incoming line remains connected to the announcement module 204 until either the caller abandons the call or the called party answers the call. In another embodiment, the application module 200 might use a time limit, where if the time limit is exceeded, the call is routed to a voice mail or disconnected, as discussed further hereinafter.

Upon receipt of the USSD signal from the MS 20 subscriber, requesting answering a call placed on delayed answering by the MSC 14, the application module 200 directs the traffic handler 202 to set the group switch 203 to connect the incoming line 201 to the outgoing line 205, establishing communication.

The implementation of the prerecorded message can be varied in different embodiments of the invention. For example, in one embodiment, the aforementioned special button or switch 306A on the MS 20 (shown in FIG. 3) may be utilized to record a message to be transmitted when a call is placed on delayed answering. When the button or switch 306A is pressed, the MS 20 informs the MSC 14 by transmitting a USSD signal requesting delayed answering database 206 to store therein said message transmitted by the subscriber from the MS 20. Upon receipt of the USSD signal requesting the delayed answering database 206 to store the message, the application module 200 forwards the incoming message to the delayed answering database 206 for storage.

Alternatively, the announcement module 204 can contain a standard prerecorded message. In such an embodiment, the application module 200 bypasses accessing the delayed answering database 206, which in this embodiment may be eliminated. It should be understood that an embodiment using a standard prerecorded message can be implemented to allow the called party to select from a variety of prerecorded messages. For example, by pressing one or more particular keys 306B on the numeric keypad of the mobile station 20 shown in FIG. 3, the called party can indicate to the calling party the approximate length of time before the called party will be available to answer the call. The application module 200 can also be implemented with a timer 210, as shown in FIG. 2, where upon expiration, the application module 200 directs the traffic handler 202 to again alert the called subscriber at the MS 20.

In another embodiment, a customized message in the delayed answering database 206 could be transmitted, followed by a selected standard message indicating the approximate length of time before the called party is available to answer. In such an embodiment, the called party at MS 20 could place the call on delayed answering, as well as indicate the length of time before the subscriber is available by accessing the switch or buttons 306A or the keys 306B. The application module 200 then retrieves the prerecorded message from the delayed answering database 206 and forwards it to the announcement module 204. The application module 200 then directs the traffic handler to connect the incoming line 201 to the announcement module 204. After the announcement module 204 completes transmitting the particular prerecorded message of the called subscriber retrieved from the delayed answering database 206, the announcement module can then play a selected standard prerecorded message. As discussed, the standard message could indicate to the calling party the length of time before the called party at the MS 20 will be available to answer the call. The application module can also utilize the timer 210, where upon expiration, the application module 200 directs the traffic handler 202 to again alert the subscriber at the MS 20.

Figure 3:
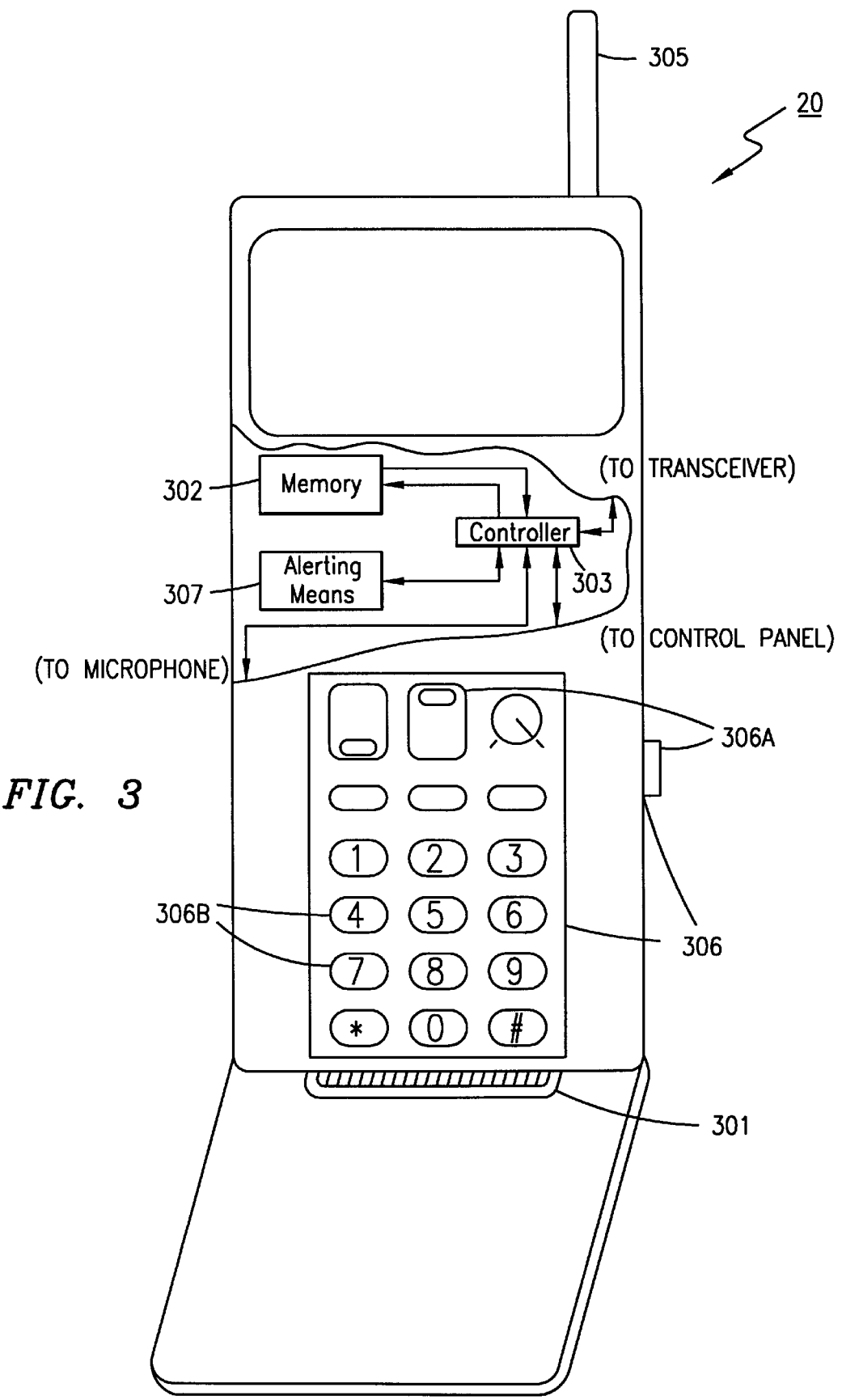
FIG. 3 is a block diagram of a Mobile Station embodying the present invention.

Referring now to FIG. 3, an MS 20 embodying the principles of the present invention is described. The MS 20 includes a microphone 301, a memory 302 containing one or more of the aforedescribed prerecorded messages, a controller 303, a transceiver 305 shown for simplicity as an antenna, a control panel 306, and an alerting means 307. In operation, when a call is received by the MS 20, the controller 303 signals the alerting means 307 to alert the caller. The alerting means can be implemented by causing the MS 20 to mechanically vibrate or otherwise move, or by making an audible ringing noise or other sound. The subscriber can then either answer the call, ignore the call, or place the call on delayed answering.

If in accordance with the present invention the subscriber chooses to place the call on delayed answering, the subscriber presses the aforedescribed button or switch, generally illustrated by the reference identifier 306A, or a number of the keys 306B on the control panel 306 causing a signal to be sent to the controller 303. Upon receipt of the signal, the controller 303 causes the transceiver 305 to transmit a connect condition to the MSC 14. The controller then causes the prerecorded message in the memory 302 to be transmitted by the transceiver 305.

As described hereinbefore, the memory 302 could include a standard prerecorded message, such as:

"The party you have called has indicated that they will be able to answer your call in approximately . . . ."

The memory 302 could also include a series of standard prerecorded messages indicating a series of particular amounts of time (such as: "one minute", "ten minutes", etc.). Contemporaneously with choosing to place the call on delayed answering, the called party could additionally indicate the approximate length of time before they will be able to answer the call, for example, by pressing the special button or switch 306A and a particular numeric key 306B on the control panel 306, e.g., the key 306B having the numeral three thereon, indicating an approximate wait of three minutes.

Once activated, the MS 20 remains off-hook until either the calling party abandons the call or the subscriber answers the call. When the subscriber is ready to answer the call, the subscriber can press the aforementioned button or switch 306A or key 306B on the control panel 306. In either event, a signal is sent to the controller 303 indicating that the caller is ready to answer the call. The controller 303 then connects the microphone 301 to the transceiver 305.

A subscriber can also record a message to be transmitted to a party placed on delayed answering by pressing the button or switch 306A or key 306B on the control panel 306. A signal is then sent to the controller 303 requesting to record a message. The controller 303 then causes the signal received from the microphone 301 to be digitized and stored into memory 302.

Those skilled in the art will recognize that the controller 303 function can be implemented in a number of ways. For example, the controller 303 can be implemented with a microprocessor or central processing unit which executes a series of instructions stored in a read-only-memory module.

As recognized by those skilled in the art, the innovative concepts described in the present application can be modified and varied over a wide range of applications. Accordingly, the scope of the patent subject matter should not be limited to any of the specific exemplary teachings discussed, but is only limited by the following claims.

What is claimed is:

1. A switching office in a telecommunication system for routing an answering communication received by a calling terminal from a called terminal, said switching office comprising:

an incoming line for receiving an initial communication from said calling terminal;

an outgoing line connected to a transceiver in communication with said called terminal;

an announcement device having at least one prerecorded message;

switch means for switching said answering communication, said switch means connecting said incoming line to said outgoing line if said answering communication is a call answering signal, and said switch means connecting said incoming line to said announcement device if said answering communication is a delayed answering signal;

a traffic handler for handling a subscriber selection command from said called terminal, said traffic handler directing said switch means to connect said incoming line to said outgoing line in response to said call answering signal and to connect said incoming line to said announcement device in response to said delayed answering signal;

an application module operably coupled to a database, said database comprising a plurality of prerecorded messages, each prerecorded message being associated with a respective called terminal, said application module further comprising a timer for timing a pre-determined time measurement; and said traffic handler further comprises an alerting means for alerting said called terminal responsive to the expiration of said pre-determined time measurement.

2. A system for answering a communication request originating from a calling terminal, said system comprising:

an outgoing line for communicating said communication request from said calling terminal to a called terminal;

transmitting means for transmitting a selected prerecorded message from a plurality of prerecorded messages, said selected prerecorded message being dependent on a subscriber selection command and comprising a time measurement, to said calling terminal;

a group switch connected to an incoming line for connecting said incoming line to said transmitting means and for connecting said incoming line to said outgoing line; and a traffic handler for handling a subscriber selection command from said called terminal, said traffic handler directing said group switch to connect said incoming line to said outgoing line in response to a call answering signal and to connect said incoming line to said transmitting means in response to a delayed answering signal.

3. The system of claim 2, further comprising:

an application module for forwarding said selected prerecorded message to said transmitting means; and a database for storing said plurality of prerecorded messages therein, each prerecorded message being associated with a respective called terminal within said system, said database forwarding the prerecorded message associated with a given respective called terminal in response to said communication request being to said given respective called terminal, said database being operably coupled to said application module.

4. The system of claim 2, wherein said plurality of prerecorded messages comprise a respective plurality of time measurements.

5. The system of claim 4, further comprising:

a clock for timing at least one of said time measurements, said at least one time measurement indicated by the selected prerecorded message; and an alarm for alerting said called terminal responsive to the expiration of said at least one time measurement.

6. In a telecommunications system, a method for answering a communication originating from a calling terminal to a called terminal within said system, said method comprising:

forwarding said communication from said calling terminal to said called terminal;

inputting, at said called terminal, a subscriber selection, said subscriber selection further comprising a message selection signal;

responsive to said inputted subscriber selection being a delayed answering signal, selecting a respective prerecorded message from a plurality of prerecorded messages, said respective prerecorded message dependent on said message selection signal and comprising a time measurement;

transmitting said respective prerecorded delayed answering message to said calling terminal; and responsive to said inputted subscriber selection being a call answering signal, transmitting, by said called terminal, a voice communication to said calling terminal.

7. The method of claim 6, wherein said step of transmitting said respective prerecorded delayed answering message further comprises the steps of:

connecting an incoming line, said incoming line communicating with said calling terminal, to an announcement module, said announcement module having a prerecorded message therein; and forwarding said respective prerecorded message to said calling terminal.

8. The method of claim 6, wherein said step of transmitting said respective prerecorded delayed answering message further comprises the steps of:

accessing a database, said database comprising said plurality of prerecorded messages therein, each prerecorded said message being associated with a respective one of a plurality of called terminals; and in response to said communication being to a respective one of said plurality of called terminals, retrieving the respective prerecorded message within said database, said respective prerecorded message being associated with said respective called terminal.

9. The method of claim 8, wherein said step of transmitting said respective prerecorded delayed answering message further comprises the steps of:

receiving a new message from said called terminal;

recording said new message from said called terminal; and forwarding said new message from said called terminal to said database.

10. The method of claim 8, wherein:

said subscriber selection further comprises a message selection signal;

said database comprises a second plurality of messages; and said step of transmitting said prerecorded delayed answering message further comprises the step of selecting another message from said second plurality of messages, said another message being dependent on said message selection signal.

11. The method of claim 10, wherein said second plurality of messages comprise a plurality of respective time measurements.

12. The method of claim 1, wherein said subscriber selection is responsive to an input from a control panel attached to said called terminal.

13. The method of claim 6, wherein:

said plurality of prerecorded messages comprise a respective plurality of time measurements.

14. The method of claim 13, wherein said step of transmitting said prerecorded delayed answering message further comprises:

setting a clock to expire at the expiration of one of said time measurements, said one time measurement being the time measurement indicated by the selected respective prerecorded message; and alerting said called terminal at the expiration of said one time measurement.

15. A mobile phone for answering a communication originating from a calling terminal, said mobile phone comprising:

a transceiver transceiving said communication;

input means for inputting a subscriber selection;

a microphone for inputting a voice communication;

memory means for storing a plurality of prerecorded messages therein; and a controller for receiving said subscriber selection from said input means, and, responsive to said subscriber selection signal, selecting a prerecorded message from said plurality of prerecorded messages, said prerecorded message comprising a time measurement, forwarding said prerecorded message to said transceiver if said subscriber selection signal is a delayed answering signal and operably coupling said microphone to said transceiver for said voice communication if said subscriber selection signal is a call answering signal said controller further comprising a computer readable medium for storing executable instructions and a microprocessor for executing the executable instructions.

16. The mobile phone of claim 15, wherein said controller, responsive to said subscriber selection, stores said voice communication from said microphone in said memory means.

17. The mobile phone of claim 15, wherein said plurality of prerecorded messages comprise a respective plurality of time measurements.

* * * * *